Sept. 5, 1967 P. H. HOFER 3,340,122
METHOD OF PRODUCING LAMINATED THERMOPLASTIC FILM
Filed Dec. 19, 1962
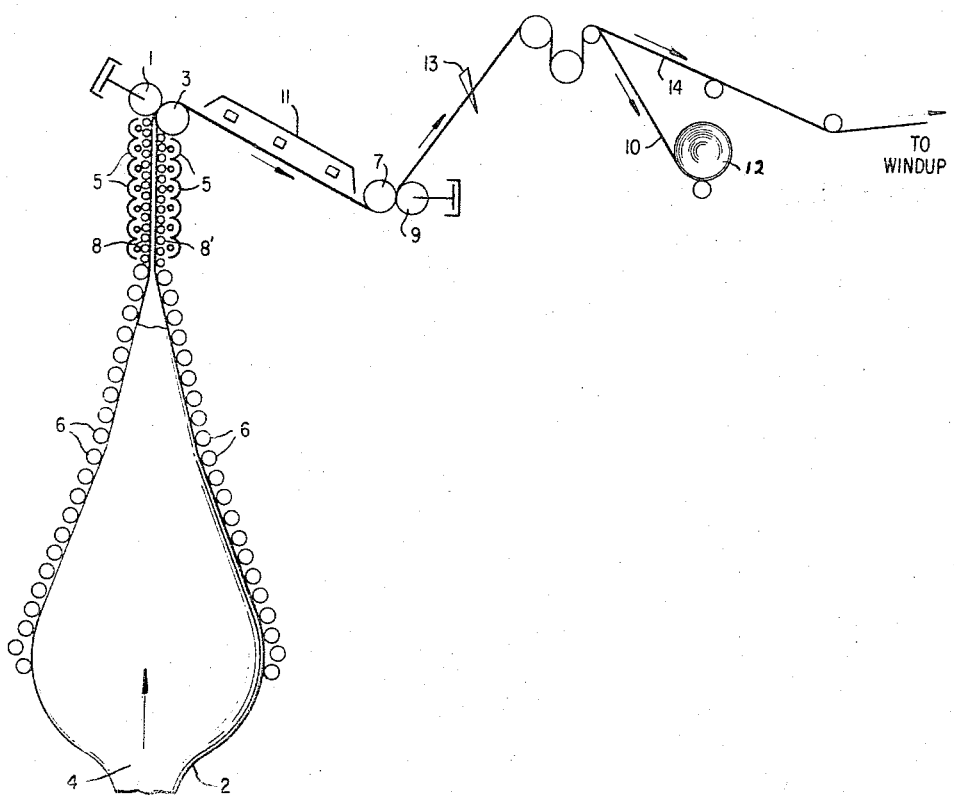
INVENTOR.
PETER H. HOFER
BY *James C. Arrantee*
ATTORNEY 3,340,122
METHOD OF PRODUCING LAMINATED THERMOPLASTIC FILM
Peter H. Hofer, Berkeley Heights, N.J., assignor to Union Carbide Corporation, a corporation of New York
Filed Dec. 19, 1962, Ser. No. 245,857
7 Claims. (Cl. 156—244)

This invention relates to a method of producing laminated film from molecularly oriented, thermoplastic tubing. More particularly, this invention relates to a method for the production of laminated, thermoplastic film which is characterized by a relatively uniform gauge (i.e. thickness) and by improved physical properties.

It is known that the physical properties of thermoplastic polymers, such as tensile strength and tensile elongation, can be substantially improved by uncoiling and orienting the molecules thereof by a stretching operation at appropriate temperatures. For purposes of stretching thermoplastic polymers, two basic techniques are employed, namely the so-called "bubble" technique wherein thermoplastic tubing is stretched and the "flat-film" technique wherein flat, thermoplastic film is stretched.

Conventionally, stretching of flat, thermoplastic film has involved engagement of the edges of the flat film by two cooperating clamping devices which travel along a prescribed path and are intended to stretch the flat film. The use of clamping devices for the purpose of stretching flat film is objectionable, however, for a number of reasons. For example, it has been found that a disproportionately high stress becomes concentrated in the flat film at and adjacent the clamping devices thereby often resulting in a tearing of the film at these points. In view of the high stress concentration in the flat film at and adjacent to the clamping devices, it has been extremely difficult to stretch thin film, that is, film on the order of about 10 mils or less in thickness, as such film easily tears at points of high stress concentration. In addition, apparatus having clamping devices for the purpose of stretching flat film cannot be easily or quickly adjusted in order to increase or decrease the degree of stretch to be effected in the film, particularly in the transverse direction. As a rule, it is necessary to interrupt the stretching operation when any adjustment in the degree of stretch is desired. In many instances, the flat film has to be rethreaded through the clamping devices after such adjustment has been made. Such interruptions are particularly undesirable as they decrease productivity and increase production costs.

In view of the many disadvantages of stretching thermoplastic film by means of clamping devices, the "bubble" technique of stretching thermoplastic material has proved to be more attractive, particularly since this technique does not make use of clamping devices, as described. The "bubble" technique generally involves extruding a thermoplastic polymer into the form of a continuous length of tubing at a temperature in excess of its first order phase transition temperature, collapsing the tubing at a point spaced from the point of extrusion and between the point of extrusion and the point of collapsing, first cooling the tubing to a temperature between its first and second order phase transition temperature and then expanding the tubing to a diameter greater than its extruded diameter by introducing and maintaining a gaseous medium under pressure within the tubing. The tubing is "set" at its expanded diameter by cooling and then slit along its edges to provide molecularly oriented, flat thermoplastic film.

Although the "bubble" technique is more desirable than the "flat-film" technique as a means of producing molecularly oriented, thermoplastic film, it has been found difficult, in many instances, to eliminate the gauge variation across the width of the film which is produced on slitting the collapsed tubing at the sides thereof. At best, gauge variation across a film, produced using the "bubble" technique, is ±15% and this only with careful adjustment of the die orifice from whence the tubing is extruded. An additional operating problem with respect to producing molecularly oriented, thermoplastic film by means of the "bubble" technique is the requirement of having 2 wind-up assemblies, one assembly for each sheet which is produced simultaneously, on slitting the collapsed tubing, as described.

The present invention provides for the production of flat film, characterized by relatively uniform gauge and by improved physical properties, from thermoplastic tubing which has been molecularly oriented by the "bubble" technique. By means of the present invention, no orientation effected in the thermoplastic tubing by the "bubble" technique is lost during the lamination step. In addition, whereas in the past two wind-up roll assemblies were required in the production line for film formed on slitting the collapsed tubing, which has been molecularly oriented by the "bubble" technique, only one such wind-up roll assembly is now required.

Accordingly, in its broadest aspect, the present invention comprises collapsing a molecularly oriented, thermoplastic tubing so that the interior walls thereof are brought into intimate surface contact, travelling the tubing from the point at which the tubing is collapsed while heating the tubing to maintain the tubing at a temperature of about 20° C. in excess of the second order phase transition temperature and below the first order phase transition temperature thereof, and while travelling and heating the tubing maintaining the tubing under sufficient tension to maintain the intimate surface contact of the walls of the tubing and to prevent shrinkage thereof and thereafter forcing the interior walls of the tubing together while said tubing is at a temperature of about 20° C. in excess of its second order phase transition temperature and below its first order phase transition temperature, with sufficient force to effect a fusion thereof.

The present invention is more fully described by the discussion which follows taken in conjunction with the accompanying drawing.

Referring now to the accompanying drawing, a thermoplastic polymer is extruded in the form of a seamless tubing 2 from an extrusion die head (not shown) of conventional extruder (not shown). Tubing 2 is expanded at a temperature at which the molecules thereof are oriented in the direction or directions in which a stress is applied. A multi-directional stretching of thermoplastic tubing 2 is effected, that is, a stretch in the longitudinal direction and in the transverse direction, by introducing and maintaining a gaseous medium 4 within the interior of tubing 2. Gaseous medium 4 rides as an entrapped bubble between the extrusion die head (not shown) and cooperating, rotating pressure rolls 1 and 3, the function of which will be described subsequently. Tubing 2 is withdrawn from the extrusion die head (not shown) at a rate faster than the rate of extrusion from the die head by operating cooperating, rotating pressures rolls 1 and 3 at an appropriate rate. Once tubing 2 is expanded and set at its final predetermined diameter, it is gradually collapsed, generally at room temperature, about 23° C. by a collapsing frame which is made up of a set of converging rollers 6 whereby the walls of tubing 2 are brought into a substantially parallel and spaced relationship. The number, arrangement, length and diameter of converging rollers 6 are such that tubing 2 is gradually collapsed to a point where the walls of tubing 2 are brought into a spaced and substantially parallel relationship. As a rule, the length of the collapsing frame defined by converging rollers 6 to the point where the walls of the tubing are brought into a spaced and substantially parallel relationship, is about 2 to about 5 times the maximum diameter of the expanded tubing. At this point, the included angle of the converging rollers is generally about 10 degrees to about 40 degrees, with the included angle in each instance dependent upon the nature of the thermoplastic tubing which is being collapsed.

Once the walls of the tubing have been brought into a substantially parallel and spaced relationship, the spacing between walls of the tubing being about ¼ of an inch to about ½ of an inch, the partially collapsed tubing is heated at a temperature of about 5° C. to about 15° C. above its second order phase transition temperature for a period of time ranging from about 5 seconds to about 120 seconds while maintaining the aforementioned substantially parallel and spaced relationship of the walls of the tubing. The substantially parallel and spaced relationship of the walls of the tubing is maintained by pressure of the gaseous medium within the interior of the tubing as the tubing passes through the parallel section defined by parallel section defined by parallel rollers 8.

The length of the parallel section defined by parallel rollers 8, will actually depend upon the thermoplastic tubing being processed, but is usually from about 10 to about 20 percent of the total length of the collapsing frame which includes the length of the collapsing frame defined by rollers 6 and by rollers 8. The diameter and length of each roller 8 will be such that tubing 2 is maintained in a substantially parallel and spaced relationship, as described.

Heating of tubing 2 in the section defined by rollers 8 is conveniently accomplished by positioning heating lamps 5 adjacent to rollers 8 as is shown in the accompanying drawing.

By maintaining the substantially parallel and spaced relationship of the walls of tubing 2 while heating tubing 2 in the section defined by rollers 8, as previously described, substantially all of the wrinkles and creases in tubing 2 are in effect "ironed" out and tubing 2 is collapsed at cooperating, rotating pressure rolls 1 and 3 in a substantially wrinkle free and crease free condition.

As previously stated, tubing 2 is withdrawn from the extruder (not shown) at a rate greater than the rate of extrusion by two cooperating, rotating pressure rolls 1 and 3, and also at a rate such that the tubing is heated, in the parallel section defined by parallel rollers 8, at the temperatures and for the period of time previously noted. In addition, the rate of extrusion and peripheral speed of rolls 1 and 3 are such that there is no sagging of the partially collapsed tubing.

Tubing 2 is withdrawn from rolls 1 and 3, the point at which tubing 2 is collapsed, by a second pair of cooperating, rotating pressure rolls 7 and 9. Pressure rolls 7 and 9 are operated at a peripheral speed greater than rolls 1 and 3 with the result that the interior walls of tubing 2 are maintained in intimate contact and under sufficient tension to prevent a multi or unidirectional shrinkage thereof, as the tubing travels in a flat plane from cooperating pressure rolls 1 and 3 to cooperating pressure rolls 7 and 9.

Between rolls 1 and 3 and 7 and 9, tubing 2 is heated to maintain the tubing at a temperature in excess of about 20° C. above its second order phase transition temperature, and below its first order phase transition temperature while being maintained under sufficient tension, as described.

Heating of travelling tubing 2 is conveniently accomplished by positioning heaters 11 which extend transversely across the full length of collapsed tubing 2 in close proximity thereof as is shown in the drawing.

The length of the heating zone defined by heaters 11 and the distance between the two sets of cooperating pressure rolls can be varied as desired to bring tubing 2 to a desired temperature as it passes into the nip of rolls 7 and 9.

At cooperating pressure rolls 7 and 9, with tubing 2 at a temperature of at least about 20° C. in excess of the second order phase transition temperature and below the first order phase transition temperature thereof, the interior walls of tubing 2 are forced into contact under a pressure sufficient to effect a complete fusion thereof.

The temperature of the cooperating rolls 7 and 9 can be varied as desired provided that the temperature of tubing 2, as it is being laminated at rolls 7 and 9, is at least about 20° C. in excess of its second order phase transition temperature and below its first order phase transition temperature.

On passing through cooperating pressure rolls 7 and 9, the laminated tubing is cooled to a permanent set, as for example by air cooling and edge trimmed by knife 13. Edge trim strips 10 are wound up on roll 12 and the flat, laminated film 14 directed to a wind-up roll (not shown).

The method of the present invention can be used to laminate any thermoplastic tubing. It is particularly desirable for use in laminating tubing formed from thermoplastics having a tensile modulus (ASTMD–822–TC) in excess of about 100,000 p.s.i. Illustrative of suitable thermoplastics are styrene polymers such as homopolymers of styrene, p-chlorostyrene, α-methylstyrene, p-ethylstyrene and the like; as well as polymers formed on reacting these monomers with one or more of the following monomers: acrylic esters such as 2-ethylhexylacrylate, butyl methacrylate, octyl methacrylate and the like; acrylonitrile, and other like monomers.

It is to be understood that the actual working temperatures involved on heating the thermoplastic tubing, after it has been collapsed at the first set of cooperating pressure rolls, will depend upon the nature of the thermoplastic material. With polystyrene, temperatures utilized are generally on the order of about 102° C. to about 120° C.

Pressures utilized to effect a fusion of the interior walls of the thermoplastic tubing will also depend upon the nature of the thermoplastic being laminated. Laminating polystyrene tubing, pressures are used which are generally at least about 500 p.s.i. and preferably about 2000 p.s.i.

The following example further illustrates the present invention and is not intended to limit the scope thereof in any manner.

*Example 1*

Polystyrene, having a molecular weight of about 70,000, as determined by the well-known Staudinger measurement, and having a second order phase transition temperature of 82° C., was fed into a Royle extruder which had an extruder bore size of 4½ inches. The extruder had 4 heated zones, maintained at 140° C. to 200° C. The polystyrene was screw fed along the barrel of the extruder to the extrusion die head and extruded from the die orifice thereof, at a temperature of 190° C., into the form of a continuous tubing having an outside diameter of 5 inches and a wall thickness of 0.10 inch. The emergent tubing was fed through a collapsing frame, 15 feet long, which consisted of a series of converging, rotatable rollers (identified by numeral 6 in accompanying drawing), set at an included angle 15°, and a series of parallel, rotatable rollers (identified by numeral 8 in the accompanying drawing). The tubing was fed from the parallel, rotatable rollers to a first set of cooperating, pressure rollers (identified by numerals 1 and 3 in the accompanying drawing). The rate of extrusion was 140 pounds per hour. After stability of the system was attained, the temperature at which the tubing was extruded was lowered to 160° C. and the pressure under which the tubing was extruded was increased from 2500 p.s.i. to about 3500 p.s.i. The tubing was then expanded by introducing air, which was at 23° C., into the interior of the tubing located between the first set of cooperating, pressure rolls and the orifice of the extrusion die and maintaining this air therein under pressure.

Enough air pressure was maintained within the tubing to expand the tubing to 7 times its extruded diameter and to prevent contact of the interior walls of the tubing, with each other, between the extrusion die orifice and the first set of cooperating, pressure rolls.

Between the extrusion die orifice and the first set of cooperating, pressure rolls, the tubing passed through the converging section of the collapsing frame and then through the parallel section of the collapsing frame. As it passed through the converging section of the collapsing frame, the tubing was gradually collapsed to a flat ellipse. The walls of the flat ellipse were substantially parallel and spaced about ⅜ of an inch apart. The partially collapsed tubing was then passed through the parallel section of the collapsing frame and to the first set of cooperating, pressure rolls. Under the operating conditions, the tubing was heated at 95° C. for 5 seconds while in the parallel section by means of electrical resistance rod heaters which were positioned adjacent to the rollers defining the parallel section.

After passing through the nip of the first set of cooperating, pressure rolls, the tubing was heated to a temperature of 102° C. by variac controlled, electrical strip heaters which extended across the full width of the collapsed tubing. During this latter heating step, the tubing was maintained under tension by operating the second set of cooperating, pressure rolls (identified by numerals 7 and 9 in the accompanying drawing) at a peripheral speed of 5 percent greater than the peripheral speed of the first set of cooperating, pressure rolls.

At the second set of cooperating, pressure rolls, the interior walls of the tubing were forced together under sufficient pressure to effect a fusion thereof. The pressure in the nip of these rolls was 1000 p.s.i. The laminated tubing was cooled to a permanent set, edge trimmed and the flat film wound on a spool. The edge trims 10 were also wound on a spool.

Properties of the laminated, flat-film are noted below and compared to properties of a flat-film produced in a manner as described above with the exception that the laminating step was omitted.

|  | Laminated Film | Non-Laminated Film |
|---|---|---|
| Tensile Strength (p.s.i.), MD (ASTM D-882-54TC) (p.s.i.), TD | 9,570<br>10,400 | 9,000<br>10,000 |
| Tensile Elongation (percent), MD (ASTM D-882-54TO) (percent), TD | 10<br>10 | 3<br>3 |
| Gauge Variation (percent) | ±8 | ±15 |

MD—indicates machine direction.
TD—indicates transverse direction.

The first and second order phase transition temperatures of polymers can be conveniently determined by methods described in an article by Fred E. Wiley, "Transition Temperatures and Cubical Expansion," appearing in Industrial and Engineering Chemistry, vol. 24, September 1942.

As indicated by the data of Example 1, not only does the present invention provide for the production of flat film which is characterized by relatively uniform gauge, but in addition, the physical properties of the laminated film are significantly improved.

The method of the present invention can be used in combination with an in-line coating operation to provide composite structures wherein a layer of a coating material is laminated between walls of the thermoplastic tubing and/or onto the outer surfaces thereof.

A more detailed description of collapsing a molecularly oriented tubing to a substantially wrinkle and crease free condition is to be found in U.S. Patent 2,955,318 to S. O. Cook et al., the disclosure of which is incorporated herein by reference.

What is claimed is:

1. Method of producing laminated thermoplastic film which comprises continuously forming a molecularly oriented thermoplastic tubing from a thermoplastic which has a first and second order phase transition temperature and a tensile modulus in excess of about 100,000 p.s.i. collapsing said tubing so that the interior walls thereof are brought into intimate surface contact, moving the tubing from the point at which the tubing is collapsed while heating the tubing to maintain the tubing at a temperature in excess of about 20° C. above the second order phase transition temperature and below the first order phase transition temperature thereof, and while moving and heating the said tubing, maintaining the said tubing under sufficient tension to maintain the intimate surface contact of the walls of the tubing and to prevent shrinkage thereof and thereafter forcing the interior walls of the tubing together while said tubing is at a temperature of about 20° C. in excess of its second order phase transition temperature and below its first order phase transition temperature with sufficient force to effect a fusion thereof.

2. Method as defined in claim 1 wherein the tubing is a polystyrene tubing.

3. Method as defined in claim 2 wherein said tubing is heated to a temperature of about 102° C. to about 120° C.

4. Method as defined in claim 2 wherein said interior walls are fused together under a pressure of at least about 500 p.s.i.

5. Method as defined in claim 2 wherein said interior walls are fused together under a pressure of about 2000 p.s.i.

6. Method as defined in claim 2 wherein said tubing is heated to a temperature of about 102° C. to about 120° C. and said interior walls are fused together under a pressure of about 2000 p.s.i.

7. Method as defined in claim 2 wherein said tubing is heated to a temperature of about 102° C. to about 120° C. and said interior walls are fused together under a pressure of at least about 500 p.s.i.

References Cited

UNITED STATES PATENTS

| 2,955,318 | 10/1960 | Cook et al. | 264—95 |
| 3,052,283 | 9/1962 | Pierce et al. | 156—306 |
| 3,159,698 | 12/1964 | Suh et al. | 161—160 |

FOREIGN PATENTS

| 545,060 | 6/1956 | Italy. |

OTHER REFERENCES

"Plastics Technology," article by James Bailey (TS1870-144) published in India Rubber World vol. 118, May 1948, pp. 225–231 (page 226, col. 3, relied on).

EARL M. BERGERT, *Primary Examiner.*

J. P. MELOCHE, *Assistant Examiner.*